US012797282B2

(12) United States Patent
Wang et al.

(10) Patent No.: US 12,797,282 B2
(45) Date of Patent: Nov. 17, 2026

(54) EXOSKELETON FOR REHABILITATION

(71) Applicant: ANGELEXO SCIENTIFIC CO., LTD, Hangzhou (CN)

(72) Inventors: Jianhui Wang, Hangzhou (CN); Luya Li, Hangzhou (CN); Pengfei Zhang, Hangzhou (CN); Linggang Yu, Hangzhou (CN); Yanjun Fan, Hangzhou (CN); Sen Yang, Hangzhou (CN)

(73) Assignee: ANGELEXO SCIENTIFIC CO., LTD, Hangzhou (CN)

( * ) Notice: Subject to any disclaimer, the term of this patent is extended or adjusted under 35 U.S.C. 154(b) by 841 days.

(21) Appl. No.: 18/176,623

(22) Filed: Mar. 1, 2023

(65) Prior Publication Data

US 2023/0293381 A1 Sep. 21, 2023

Related U.S. Application Data

(63) Continuation-in-part of application No. PCT/CN2022/127409, filed on Oct. 25, 2022.

(30) Foreign Application Priority Data

Mar. 15, 2022 (CN) ......................... 202210250402.1

(51) Int. Cl.
*A61H 3/00* (2006.01)
*A45B 9/02* (2006.01)
(Continued)

(52) U.S. Cl.
CPC ................. *A61H 3/00* (2013.01); *A45B 9/02* (2013.01); *A61H 1/0262* (2013.01);
(Continued)

(58) Field of Classification Search
CPC ....... A61H 3/00; A61H 1/0262; A61H 1/0266
See application file for complete search history.

(56) References Cited

U.S. PATENT DOCUMENTS 9,682,006 B2 * 6/2017 Goldfarb .............. A61G 7/1017
10,137,050 B2 * 11/2018 Goffer .................. A61H 1/0262
(Continued)

FOREIGN PATENT DOCUMENTS

CN 2899840 Y 5/2007
CN 103153356 A 6/2013
(Continued)

*Primary Examiner* — Brandy S Lee
*Assistant Examiner* — Rohan Patel
(74) *Attorney, Agent, or Firm* — Perry + Currier Inc.

(57) ABSTRACT

The present disclosure discloses an exoskeleton for rehabilitation, comprising: a healthy-side exoskeleton, an affected-side exoskeleton, a first sensor, a control unit, and a driving device, wherein the first sensor is configured to detect a pressure received by the shoe sole and generate a first electrical signal, the control unit is configured to judge, according to the first electrical signal, whether to generate the first control signal, and the driving device is configured to drive the affected-side exoskeleton according to the first control signal. When a shoe sole is not landed steadily, the affected-side exoskeleton does not drive the affected side to step out, thereby avoiding the problem that the affected side takes a step when the healthy side does not stand firm. Therefore, the present exoskeleton for rehabilitation has the advantages of better controlling for limb coordination and having higher using safety.

15 Claims, 8 Drawing Sheets

(51) Int. Cl.
*A61H 1/02* (2006.01)
*A45B 9/00* (2006.01)

(52) U.S. Cl.
CPC ...... *A61H 1/0266* (2013.01); *A45B 2009/007* (2013.01); *A61H 2003/007* (2013.01); *A61H 2201/1261* (2013.01); *A61H 2201/1642* (2013.01); *A61H 2201/165* (2013.01); *A61H 2201/5007* (2013.01); *A61H 2201/5061* (2013.01); *A61H 2230/625* (2013.01)

(56) References Cited

U.S. PATENT DOCUMENTS

| | | | | |
|---|---|---|---|---|
| 11,871,820 | B2 * | 1/2024 | Popov | A61B 5/1036 |
| 2013/0158445 | A1 | 6/2013 | Kazerooni et al. | |
| 2013/0197408 | A1 | 8/2013 | Goldfarb et al. | |
| 2013/0237884 | A1 | 9/2013 | Kazerooni et al. | |
| 2015/0351991 | A1 * | 12/2015 | Amundson | A61H 1/0244 623/24 |
| 2016/0030201 | A1 * | 2/2016 | Zoss | A61H 3/008 623/24 |
| 2017/0340504 | A1 | 11/2017 | Sanz Merodio et al. | |
| 2017/0360644 | A1 * | 12/2017 | Hyun | A61H 1/0244 |
| 2018/0141206 | A1 * | 5/2018 | Bereziy | B25J 9/0006 |
| 2019/0015287 | A1 | 1/2019 | Witte et al. | |
| 2020/0000373 | A1 * | 1/2020 | Agrawal | A61B 5/7405 |
| 2020/0078253 | A1 * | 3/2020 | Song | A61H 1/0237 |
| 2020/0179215 | A1 | 6/2020 | Lerner | |
| 2020/0368094 | A1 | 11/2020 | Yoshimi et al. | |

FOREIGN PATENT DOCUMENTS

| | | | | |
|---|---|---|---|---|
| CN | 103976739 | A | 8/2014 | |
| CN | 203986458 | U | 12/2014 | |
| CN | 105213155 | A | 1/2016 | |
| CN | 105286874 | A | 2/2016 | |
| CN | 105456000 | A | 4/2016 | |
| CN | 108161905 | A | 6/2018 | |
| CN | 108939436 | A | 12/2018 | |
| CN | 109044743 | A | 12/2018 | |
| CN | 110251372 | A | 9/2019 | |
| CN | 110861074 | A | 3/2020 | |
| CN | 110974631 | A | 4/2020 | |
| CN | 111249116 | A | 6/2020 | |
| CN | 211214238 | U | 8/2020 | |
| CN | 111773037 | A | 10/2020 | |
| CN | 113230094 | A | 8/2021 | |
| CN | 114642573 | A | 6/2022 | |
| EP | 1707175 | A1 | 10/2006 | |
| JP | 2009207840 | A | 9/2009 | |
| KR | 20110076418 | A | 7/2011 | |
| KR | 101913187 | B1 | 1/2019 | |
| WO | WO-2022012491 | A1 * | 1/2022 | A61H 3/00 |

* cited by examiner

EXOSKELETON FOR REHABILITATION

CROSS-REFERENCE TO RELATED APPLICATION

The present disclosure claims the priority to the Chinese patent application with the filing No. 202210250402.1, filed on Mar. 15, 2022 with the Chinese Patent Office, and entitled "Exoskeleton for Rehabilitation", the contents of which are incorporated herein by reference in entirety.

TECHNICAL FIELD

The present disclosure belongs to the technical field of medical devices, particularly an exoskeleton for rehabilitation.

BACKGROUND ART

Exoskeleton robots, also known as mechanical exoskeletons or powered exoskeletons, are mechanical devices that are constructed by a mechanical frame and can be worn by people, such devices can drive limbs to move through a driver, and are widely applied to fields such as medical rehabilitation, assistance of disabled people and power assistance.

An existing Chinese patent for invention with the filing number "201410827881.4" discloses an exoskeleton walking-aid rehabilitation robot for human lower limb, including: a lower back movement module, a hip joint movement module, a knee joint movement module, and an ankle joint movement module, wherein a back servo motor drives a hip joint to move, an electric knee push rod drives a knee joint to move; and an electric ankle push rod drives an ankle joint to move. The above invention helps patients with lower limb paralysis to stand and walk, and flexion and extension movements of the hip joint, the knee joint, and the ankle joint are controlled by collecting a pressure signal of a sole, so as to help the patients to stride.

However, the prior art is not perfect, and the existing rehabilitation robots have the following problems.

(1) The existing rehabilitation robots need to select preset rehabilitation training parameters at a host end, so as to make the rehabilitation robots assist the patients to complete actions of rehabilitation training, such that the patients can only be trained passively according to preset gaits, which causes the problem that the patient lacks autonomy and initiative in rehabilitation movements.

(2) The existing rehabilitation robots generally use a multi-axis gyroscope sensor to predict a walking intent of a user, and then control an exoskeleton robot to walk, such prediction mode cannot guarantee the accuracy, and the safety is not high. The reason is that the accuracy of the walking intent itself predicted by the multi-axis gyroscope sensor is not high, which will inevitably cause a problem that the patient starts striding in the case of not standing firm, and bring safety risks. Therefore, there is an urgent need to develop an exoskeleton robot with better safety.

(3) In addition, users often desire to autonomously control start and stop frequency and gait of the rehabilitation robot exoskeleton, for example, a patient may feel tired after walking, and has a temporary requirement of standing, or due to the reduced mobility of lower limb, the patient himself/herself cannot step alternately at a fixed frequency. Therefore, there is an urgent need to develop an exoskeleton robot capable of being adapted to irregular walking scenes.

SUMMARY

The present disclosure provides an exoskeleton for rehabilitation, so as to at least solve shortcomings and existing problems of related technologies, and achieve the above objectives.

The present disclosure may adopt the following technical solutions.

An exoskeleton for rehabilitation, which may include:

a healthy-side exoskeleton, wherein the healthy-side exoskeleton is provided thereon with a first binding member, and the healthy-side exoskeleton is configured to be positioned on a healthy side of a patient through the first binding member;

an affected-side exoskeleton, wherein the affected-side exoskeleton is provided thereon with a second binding member, and the affected-side exoskeleton is configured to be positioned on an affected side of the patient through the second binding member;

a shoe, wherein the shoe is configured to be worn on a foot of the healthy side of the patient, and the shoe includes a shoe sole for the foot of the healthy side of the patient to step on;

a first sensor, wherein the first sensor is provided on the shoe sole, and is configured to detect a pressure received by the shoe sole and generate a first electrical signal;

a control unit, wherein the control unit is connected to a support provided between the healthy-side exoskeleton and the affected-side exoskeleton, and the control unit is in communication connection with the first sensor, and is configured to judge, according to the first electrical signal, whether to generate the first control signal; and a driving device, wherein the driving device is provided on the affected-side exoskeleton, and is configured to be in communication connection with the control unit, and drive the affected-side exoskeleton according to the first control signal.

Optionally, the healthy-side exoskeleton includes at least one of a healthy-side hip mechanical joint, a healthy-side knee mechanical joint, and a healthy-side ankle mechanical joint, and degrees of freedom of the healthy-side hip mechanical joint, the healthy-side knee mechanical joint, and the healthy-side ankle mechanical joint are respectively set to be consistent with degrees of freedom of a healthy-side hip joint, a healthy-side knee joint, and a healthy-side ankle joint of the patient.

Optionally, the affected-side exoskeleton includes at least one of an affected-side hip mechanical joint, an affected-side knee mechanical joint, and an affected-side ankle mechanical joint, and degrees of freedom of the affected-side hip mechanical joint, the affected-side knee mechanical joint, and the affected-side ankle mechanical joint are respectively set to be consistent with degrees of freedom of an affected-side hip joint, an affected-side knee joint, and an affected-side ankle joint of the patient.

Optionally, the control unit being configured to judge, according to the first electrical signal, whether to generate the first control signal includes: generating the first control signal and sending the same to the driving device in cases where the first electrical signal is not less than a preset first safety value.

Optionally, the control unit is further configured to calculate a gait cycle according to the first electrical signal, and the control unit being configured to judge, according to the first electrical signal, whether to generate the first control signal includes: generating the first control signal and sending the same to the driving device in cases where the first electrical signal received is not less than the preset first safety value and the gait cycle is not less than preset safety time.

Optionally, the exoskeleton for rehabilitation includes a walking stick, and the walking stick is configured to be applied to the healthy side of the patient, and includes a support rod having an adjustable length and a handle provided on a side surface of the support rod.

Optionally, the exoskeleton for rehabilitation further includes a second sensor, the second sensor is provided in a bottom portion of the support rod, and is configured to generate a second electrical signal when detecting that the walking stick touches the ground, and the control unit is configured to judge, according to the first electrical signal and the second electrical signal, whether to generate the first control signal and is configured to generate the second control signal according to the second electrical signal.

Optionally, the control unit being configured to judge, according to the first electrical signal and the second electrical signal, whether to generate the first control signal includes: not generating the first control signal in cases where the second electrical signal is not received.

Optionally, the control unit being configured to judge, according to the first electrical signal and the second electrical signal, whether to generate the first control signal includes: generating the first control signal and sending the same to the driving device in cases where the first electrical signal received is not less than the preset first safety value and the second electrical signal received is not less than the preset second safety value.

Optionally, the driving device is configured to generate a gait cycle according to the first electrical signal, and the control unit being configured to judge, according to the first electrical signal and the second electrical signal, whether to generate the first control signal includes: generating the first control signal and sending the same to the driving device in cases where the first electrical signal received is not less than the preset first safety value, the gait cycle is not less than the preset safety time, and the second electrical signal received is not less than the preset second safety value.

Optionally, the second sensor is any one of a pressure sensor, a contact switch, a proximity switch, and a microswitch.

Optionally, the support rod includes a first rod section and a second rod section, the first rod section is slidably arranged in the second rod section, a spring is provided between the first rod section and the second rod section, the second rod section is provided thereon with a motor, and the motor is configured to compress or release the spring according to the second control signal.

Optionally, a third sensor is further included, wherein the third sensor is provided on the handle, and is configured to generate a third electrical signal when being detected to be triggered, and the control unit is configured to judge, according to the first electrical signal, the second electrical signal, and the third electrical signal, whether to generate the first control signal.

Optionally, a fourth sensor is further included, wherein the fourth sensor is provided on at least one position of the healthy-side hip mechanical joint, the healthy-side knee mechanical joint, and the healthy-side ankle mechanical joint, and is configured to detect a movement of the healthy-side exoskeleton and generate a fourth electrical signal representing healthy-side movement parameters; and the first control signal contains the healthy-side movement parameters represented by the fourth electrical signal.

Optionally, the control unit is provided therein with preset affected-side movement parameters, and the first control signal includes the affected-side movement parameters.

Optionally, the control unit is configured to: control the driving device to drive the affected-side hip mechanical joint to simulate movements of the healthy-side hip mechanical joint according to an angle of the healthy-side hip mechanical joint detected by the fourth sensor; control the driving device to drive the affected-side knee mechanical joint to simulate movements of the healthy-side knee mechanical joint according to an angle of the healthy-side knee mechanical joint detected by the fourth sensor; and/or control the driving device to drive the affected-side ankle mechanical joint to simulate movements of the healthy-side ankle mechanical joint according to an angle of the healthy-side ankle mechanical joint detected by the fourth sensor.

Compared with the prior art, the outstanding and beneficial technical effects of the present disclosure are as follows.

a. In the present disclosure, the first sensor can detect the pressure on the shoe sole, when the shoe sole is not landed steadily, the affected-side exoskeleton does not drive the affected side to step out, thereby avoiding the problem that the affected side takes a step when the healthy side does not stand firm. Therefore, the present exoskeleton for rehabilitation has the advantages of better controlling of limb coordination and having higher using safety.

b. In the present disclosure, the second sensor can detect whether the walking stick touches the ground, when the walking stick does not touch the ground or is not stable, the affected-side exoskeleton does not drive the patient to step out, thereby avoiding the problem that the affected-side exoskeleton drives the affected side to move when the walking stick does not touch the ground or is not stable, coordinating actions of the affected side and actions of the walking stick, and further improving the using safety of the present exoskeleton for rehabilitation.

c. In the present disclosure, the hand holding the walking stick can press down the third sensor, when the hand holding the walking stick does not press down the third sensor, the affected-side exoskeleton does not drive the patient to step out, so that the patient autonomously controls the rhythm of alternately stepping on the healthy side and the affected side, e.g., when the patient feels tired after walking, or has a temporary standing demand or has difficulty in moving, or cannot step alternately at a fixed frequency, the third sensor may not be pressed down, thereby avoiding the affected-side exoskeleton from driving the affected side to move. Therefore, the present exoskeleton for rehabilitation has the advantages of facilitating in completing uncoordinated gait movements, improving the patient's autonomy of controlling the device, and further improving the safety of the device.

d. In the present disclosure, the exoskeleton for rehabilitation has a plurality of control modes, and the patient can adjust the device to a control manner suitable for the current physical state, for example, a patient with a relatively low physical condition can perform rehabilitation movements in a control manner with the walking stick, and a patient with a relatively good physical condition can perform rehabilitation movements in a control manner of removing the walking stick, which facilitates the patients in better performing the rehabilitation movements and makes the device suitable for patients in different recovery stages.

e. In the present disclosure, with the gradual rehabilitation of the patient, the motor can gradually reduce the elastic force of the spring, thereby gradually reducing a support force of the walking stick to the patient, that is to say, gradually reducing the degree of dependency of the patient on the walking stick, and finally enabling the patient to perform the rehabilitation movements with the walking stick being removed, and the device automatically adjusts the intensity of the rehabilitation movements according to the actual recovery condition of the patient.

f. In the present disclosure, the control unit can generate the first control signal according to the fourth electrical signal, so that the driving device controls the affected-side exoskeleton to simulate the movements of the healthy side, and the gait of the affected side is synchronized with the gait of the healthy side, facilitating in ensuring coordination of gait consistency of the healthy side and the affected side; and the control unit further may generate the first control signal according to a preset program, so that the driving device controls the affected-side exoskeleton to move according to a preset program, and the affected side performs the rehabilitation movements according to preset actions, which can better restore the health.

Figure 1:
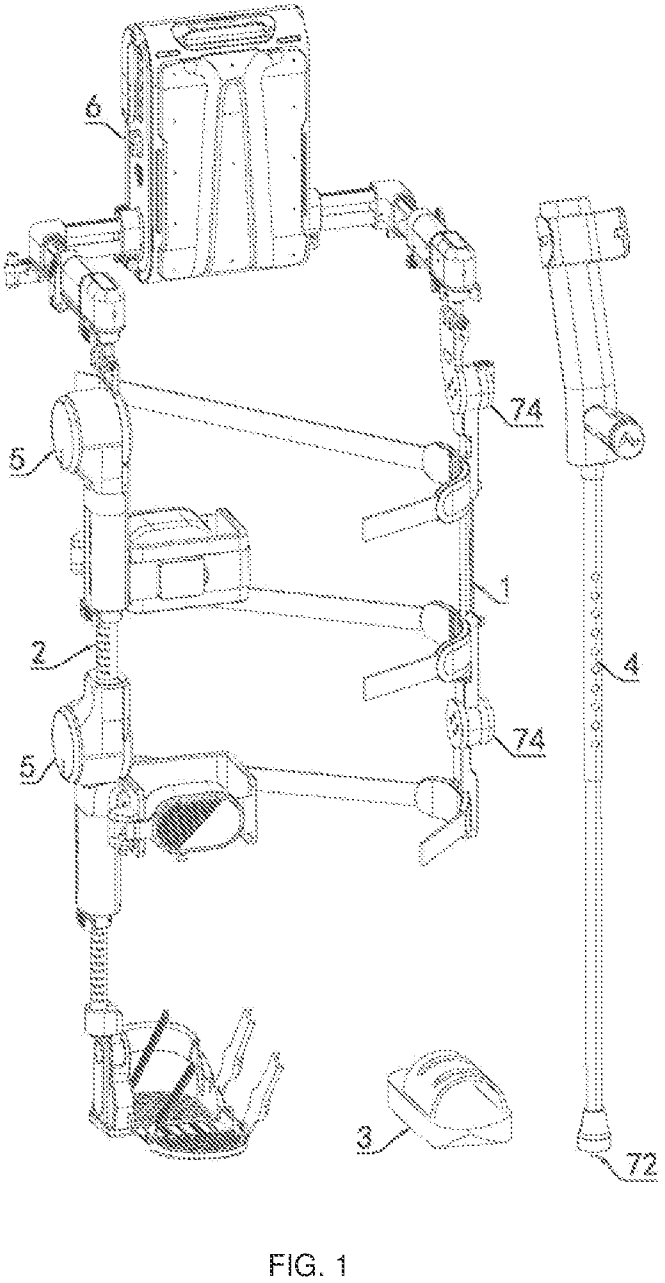
FIG. 1 is a perspective structural schematic diagram of the present disclosure.
Figure 2:
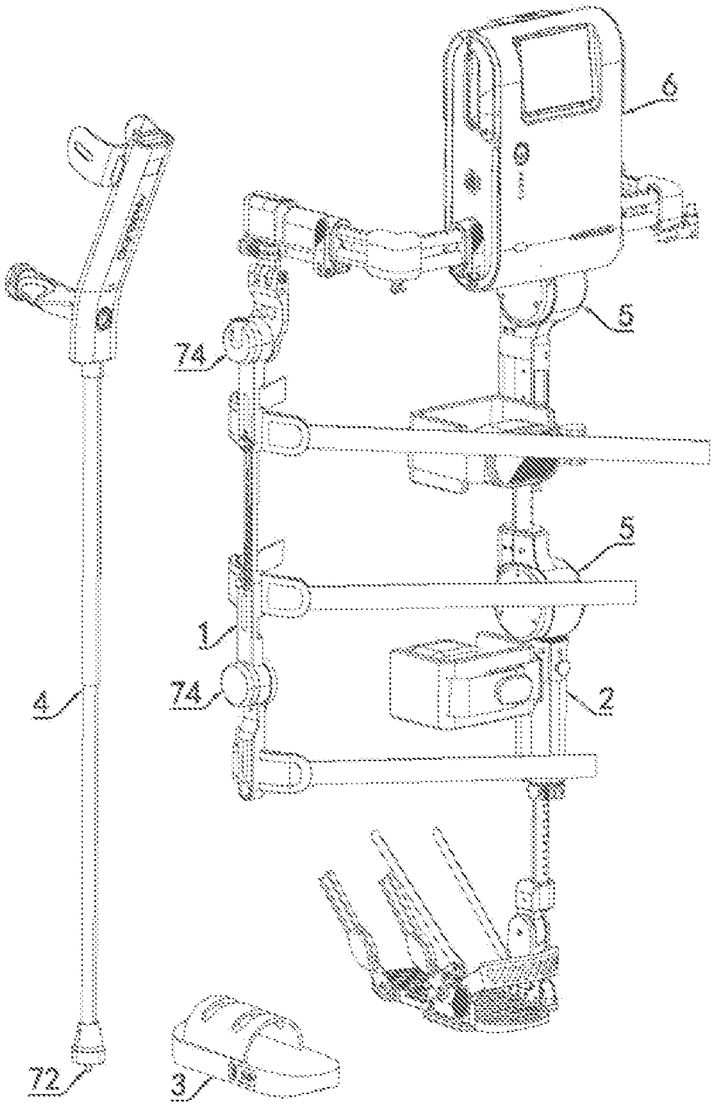
FIG. 2 is a perspective structural schematic diagram of the present disclosure.

In the drawings: 1-healthy-side exoskeleton, 2-affected-side exoskeleton, 3-shoe, 4-walking stick, 5-driving device, 6-control unit, 71-first sensor, 72-second sensor, 73-third sensor, 74-fourth sensor, 11-hip bracket, 12-intermediate bracket, 13-thigh bracket, 14-shank bracket, 15-first binding member, 21-hip support, 22-intermediate support, 23-thigh support, 24-shank support, 25-foot support, 26-second binding member, 31-shoe sole, 41-support rod, 42-handle, 43-arm bracket, 44-fitting member, 411-first rod section, 412-second rod section, 413-spring, 414-motor, 421-arc-shaped surface.

DETAILED DESCRIPTION OF EMBODIMENTS

For the ease of understanding of those skilled in the art, below the present disclosure is further described in combination with drawings and specific embodiments.

It should be noted that exoskeleton is also called as mechanical exoskeleton or powered exoskeleton, and exoskeletons can be divided into power-assistance exoskeleton, exoskeleton for rehabilitation and so on according to different application fields. The power-assistance exoskeleton is generally used on a human body with healthy limbs for improving load ability, commuting ability and so on of the human body. The exoskeleton for rehabilitation is generally used on a patient for assisting the patient in completing rehabilitation movements. The rehabilitation movement refers to helping a patient's body to recover to a normal state by using an appropriate amount of directed or targeted body movements. For example, a long-term bedridden patient has physical problems such as muscular atrophy and dyskinesia, and by using the exoskeleton for rehabilitation, the patient can be assisted in completing the rehabilitation movements. For another example, exoskeleton rehabilitation robots used in rehabilitation therapy of stroke hemiplegia patients can help patients with limb dyskinesia to complete various actions and help the stroke hemiplegia patients to recover the moving function.

As shown in FIG. 1 to FIG. 14, the present disclosure provides an exoskeleton for rehabilitation, including a healthy-side exoskeleton 1, an affected-side exoskeleton 2, a shoe 3, a walking stick 4, a first sensor 71, a second sensor 72, a third sensor 73, a fourth sensor 74, a driving device 5, and a control unit 6.

The healthy-side exoskeleton 1 is configured to be worn on a healthy side of a patient.

In the above, the healthy side refers to a limb part of the patient that is healthy and has no disease, but due to the patient's long-term bed rest and other reasons, the healthy side may have problems such as muscular atrophy and insufficient strength.

When the healthy-side exoskeleton 1 is worn on the healthy side of the patient, the healthy-side exoskeleton 1 does not affect free motion of the healthy side. Free motion of the healthy side means that none of the healthy-side ankle joint, the healthy-side knee joint, and the healthy-side hip joint is affected by the healthy-side exoskeleton 1.

The healthy-side exoskeleton 1 includes at least one of a healthy-side hip mechanical joint, a healthy-side knee mechanical joint, and a healthy-side ankle mechanical joint.

In the above, the healthy-side hip mechanical joint is corresponding to the healthy-side hip joint of the patient, and a degree of freedom of the healthy-side hip mechanical joint is set to be substantially consistent with a degree of freedom of the healthy-side hip joint of the patient. The healthy-side knee mechanical joint is correspondingly worn on the healthy-side knee joint of the patient, and a degree of freedom of the healthy-side knee mechanical joint is set to be substantially consistent with a degree of freedom of the healthy-side knee joint of the patient. The healthy-side ankle mechanical joint is corresponding to the healthy-side ankle joint of the patient, and a degree of freedom of the healthy-side ankle mechanical joint is set to be substantially consistent with a degree of freedom of the healthy-side ankle joint of the patient.

In the present embodiment, the healthy-side exoskeleton 1 includes the healthy-side hip mechanical joint and the healthy-side knee mechanical joint.

Figure 3:
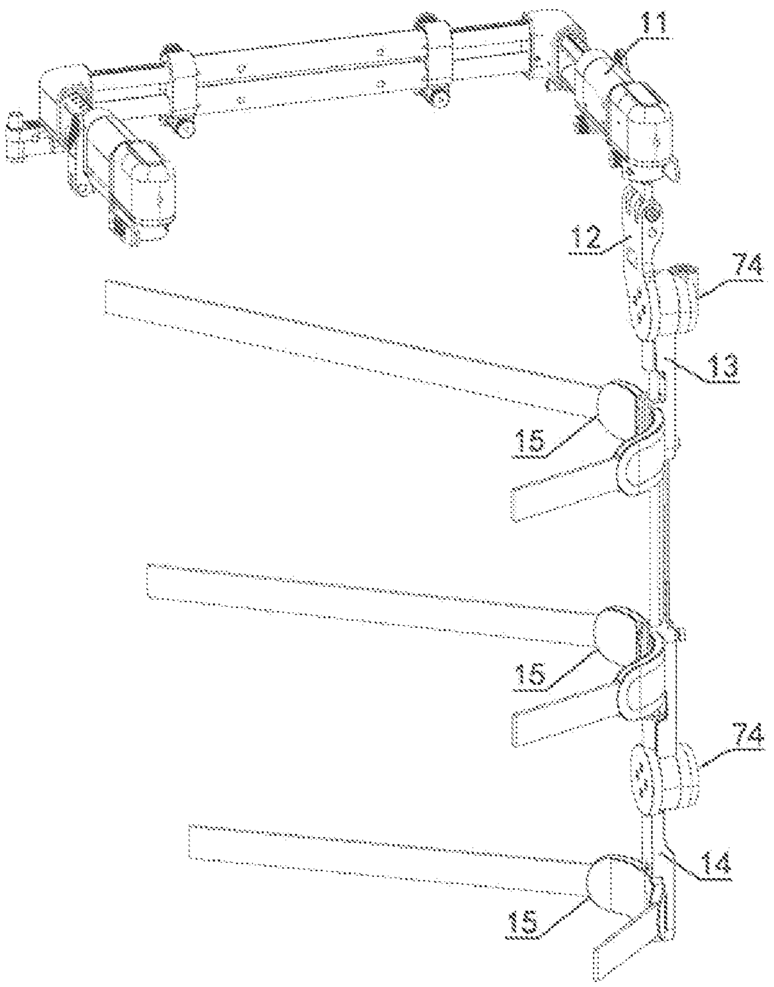
FIG. 3 is a structural schematic diagram of a healthy-side exoskeleton of the present disclosure.

As shown in FIG. 3, the healthy-side exoskeleton 1 includes a hip bracket 11, an intermediate bracket 12, a thigh bracket 13, and a shank bracket 14 which are hinged together in sequence, wherein the hip bracket 11, the intermediate bracket 12, and the thigh bracket 13 constitute the healthy-side hip mechanical joint, and the thigh bracket 13 and the shank bracket 14 constitute the healthy-side knee mechanical joint.

In the above, the hip bracket 11 is configured to be worn on the hip part of the patient. The hip bracket 11, when being worn on the hip part of the patient, can be synchronized with movements of the hip part of the patient. The intermediate bracket 12 refers to a connector between the hip bracket 11 and the thigh bracket 13, and is configured to improve the degree of freedom of the thigh bracket 13 with respect to the hip bracket 11. The thigh bracket 13 is configured to be worn on the thigh of the healthy side of the patient. The thigh bracket 13, when being worn on the thigh of the healthy side of the patient, can be synchronized with movements of the thigh of the healthy side of the patient. The shank bracket 14 is configured to be worn on the shank of the healthy side of the patient. The shank bracket 14, when being worn on the shank of the healthy side of the patient, can be synchronized with movements of the shank of the healthy side of the patient.

The thigh bracket 13 can rotate back and forth relative to the intermediate bracket 12, that is to say, the thigh bracket 13 can rotate back and forth relative to the hip bracket 11, and is configured to correspond to actions of the healthy-side hip joint of the patient. The intermediate bracket 12 can rotate left and right relative to the hip bracket 11, that is to say, the thigh bracket 13 can rotate left and right relative to the hip bracket 11, and is configured to correspond to actions of the healthy-side hip joint of the patient. The shank bracket 14 can rotate back and forth relative to the thigh bracket 13, and is configured to correspond to actions of the healthy-side knee joint of the patient.

The present exoskeleton for rehabilitation further includes a first binding member 15. The first binding member 15 is provided on the healthy-side exoskeleton 1, and the first binding member 15 can be bound on the healthy side of the patient, so that the healthy side of the patient can be positioned on the healthy-side exoskeleton 1.

In practical use, the patient's healthy side, when being bound by the first binding member 15, is positioned on the healthy-side exoskeleton 1, so that the patient's healthy side can drive the healthy-side exoskeleton to perform synchronous movements.

Specifically, there are two first binding members 15. One first binding member 15 is provided on the thigh bracket 13, and this first binding member 15 is configured to be bound on the thigh of the healthy side of the patient, so as to fixedly arrange the thigh of the healthy side of the patient and the thigh bracket 13 together. The other first binding member 15 is provided on the shank bracket 14, and this first binding member 15 is configured to be bound on the shank of the healthy side of the patient, so as to fixedly arrange the shank of the healthy side of the patient and the shank bracket 14 together.

An overall structure of each first binding member 15 is in a soft belt shape. Two ends of the first binding member 15 can be detachably connected together by means of a velcro tape, so as to facilitate the assembly and disassembly of the first binding member 15 on the healthy side of the patient.

The length of the thigh bracket 13 is adjustable. The length of the thigh bracket 13 can be adjusted according to the length of the thigh of the healthy side of the patient, so that the thigh bracket 13 can be worn on thighs of healthy sides of different patients.

Figure 4:
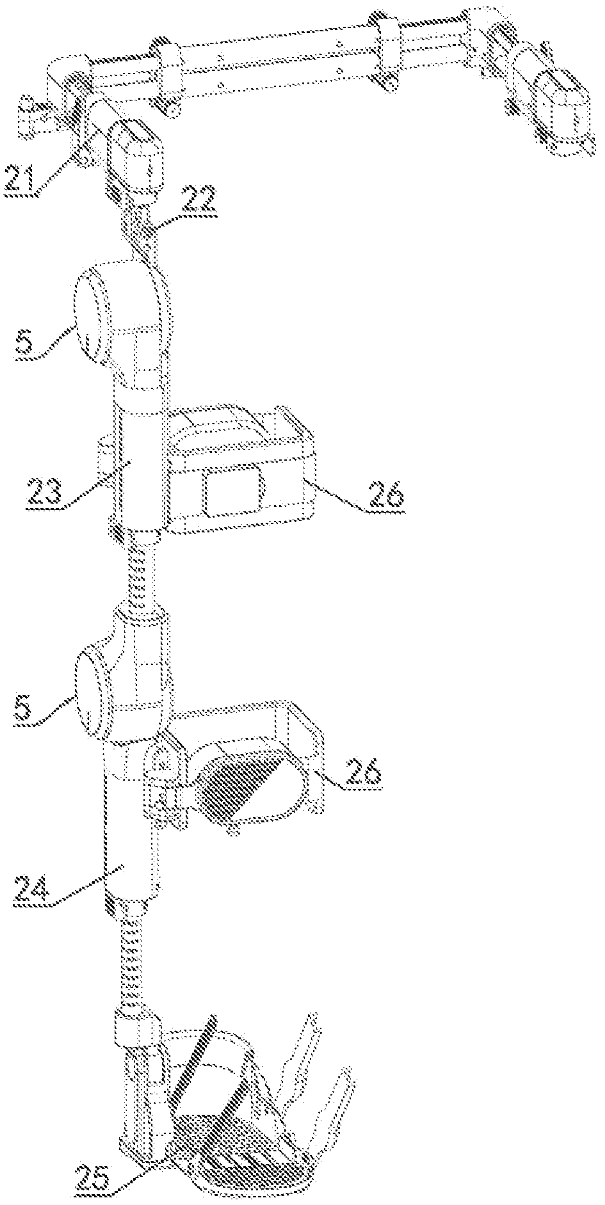
FIG. 4 is a structural schematic diagram of an affected-side exoskeleton of the present disclosure.

As shown in FIG. 4, the affected-side exoskeleton 2 is configured to be worn on an affected side of the patient.

In the above, the affected side refers to a limb of the patient suffering from a disease. In the present embodiment, the affected side is a right lower limb of the patient.

The affected-side exoskeleton 2 includes at least one of an affected-side hip mechanical joint, an affected-side knee mechanical joint, and an affected-side ankle mechanical joint.

In the above, the affected-side hip mechanical joint is configured to be worn on the affected-side hip joint of the patient, and a degree of freedom of the affected-side hip mechanical joint is substantially consistent with a degree of freedom of the affected-side hip joint of the patient. The affected-side knee mechanical joint is configured to be worn on the affected-side knee joint of the patient, and a degree of freedom of the affected-side knee mechanical joint is substantially consistent with a degree of freedom of the affected-side knee joint of the patient. The affected-side ankle mechanical joint is configured to be worn on the affected-side joint of the patient, and a degree of freedom of the affected-side ankle mechanical joint is substantially consistent with a degree of freedom of the affected-side ankle joint of the patient.

In the present embodiment, the affected-side exoskeleton 2 includes the affected-side hip mechanical joint, the affected-side knee mechanical joint, and the affected-side ankle mechanical joint.

The affected-side exoskeleton 2 includes a hip support 21, an intermediate support 22, a thigh support 23, a shank support 24, and a foot support 25 which are hinged together in sequence, wherein the hip support 21, the intermediate support 22, and the thigh support 23 constitute the affected-side hip mechanical joint, the thigh support 23 and the shank support 24 constitute the affected-side knee mechanical joint, and the shank support 24 and the foot support 25 constitute the affected-side ankle mechanical joint.

In the above, the hip support 21 is configured to be worn on the hip part of the patient. The hip support 21, when being worn on the hip part of the patient, can be synchronized with movements of the hip part of the patient. The intermediate support 22 refers to a connector between the hip support 21 and the thigh support 23, and is configured to improve the degree of freedom of the thigh support 23 with respect to the hip support 21. The thigh support 23 is configured to be worn on the affected-side thigh of the patient. The thigh support 23, when being worn on the affected-side thigh of the patient, can be synchronized with movements of the affected-side thigh of the patient. The shank support 24 is configured to be worn on the affected-side shank of the patient. The shank support 24, when being worn on the affected-side shank of the patient, can be synchronized with movements of the affected-side shank of the patient. The foot support 25 is configured to be worn on the foot part of the patient. The foot support 25, when being worn on the foot part of the patient, can be synchronized with movements of the foot of the patient.

The thigh support 23 can rotate back and forth relative to the intermediate support 22, that is to say, the thigh support 23 can rotate back and forth relative to the hip support 21, and is configured to be corresponding to actions of plantarflexion and dorsiflexion of the affected-side hip joint of the patient. The intermediate support 22 can rotate left and right relative to the hip support 21, that is to say, the thigh support 23 can rotate left and right relative to the hip support 21, and is configured to be corresponding to actions of inversion and eversion of the affected-side hip joint of the patient.

The shank support 24 can rotate back and forth relative to the thigh support 23, and is configured to be corresponding to actions of leg lifting forward and leg lifting backward of the affected-side knee joint of the patient.

The ankle joint is composed of a tibia, an articular surface of a lower end of the tibia, and a trochlea of *astragalus*, and can perform actions such as plantarflexion and dorsiflexion. The foot support 25 can rotate back and forth relative to the shank support 24, and is configured to be corresponding to actions of plantarflexion and dorsiflexion of the ankle joint.

A second binding member 26 is further included. The second binding member 26 is arranged on the affected-side exoskeleton 2, and the second binding member 26 is configured to be bound on the affected side of the patient.

In practical use, when the affected-side exoskeleton is bound together with the affected-side lower limb of the patient through the second binding member 26, the affected-side exoskeleton 2 can drive the patient's affected side to perform synchronous movements.

Specifically, there are two second binding members 26. One second binding member 26 is provided on the thigh support 23, and this second binding member 26 is configured to be bound on the affected-side thigh of the patient, so as to fixedly arrange the affected-side thigh of the patient and the thigh support 23 together. The other second binding member 26 is provided on the shank support 24, and this second binding member 26 is configured to be bound on the affected-side shank of the patient, so as to fixedly arrange the affected-side shank of the patient and the shank support 24 together.

The length of the thigh support 23 is adjustable. The length of the thigh support 23 can be adjusted according to the length of the affected-side thigh of the patient, so that the thigh support 23 can be adapted to thigh lengths of different patients.

The length of the shank support 24 is also adjustable. The length of the shank support 24 can be adjusted according to the length of the affected-side shank of the patient, so that the shank support 24 can be worn on the affected-side shanks of different patients.

The walking stick 4 is configured to assist the patient in walking. The walking stick in the present embodiment is applied to the healthy side.

In practical use, the walking stick can be held by a hand close to the healthy side, the walking stick 4 can stand on the ground, and the walking stick 4 is configured to share part of body weight of the patient. The walking stick 4 and the patient's two legs constitute a triangular support structure, improving the stability of the patient's body.

The walking stick 4 includes a support rod 41. In practical use, the support rod 41 is located between the hand and the ground, and the support rod 41 functions to support and bear load.

Figure 5:
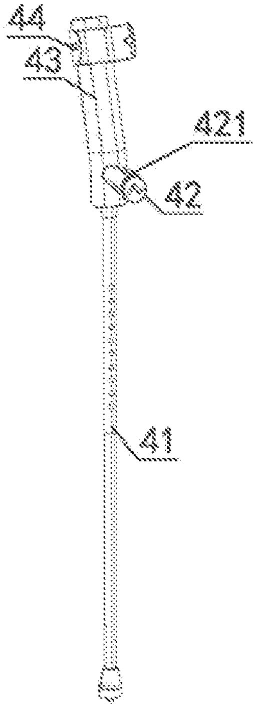
FIG. 5 is a first structural schematic diagram of a walking stick of the present disclosure.
Figure 6:
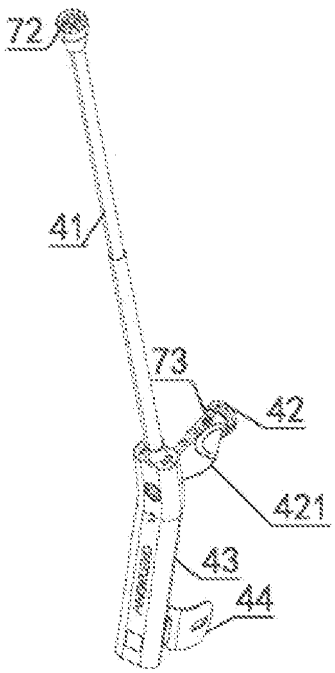
FIG. 6 is a second structural schematic diagram of a walking stick of the present disclosure.

As shown in FIG. 5, the walking stick 4 further includes a handle 42, and the handle 42 is configured to be gripped by the patient's hand, facilitating the patient to be supported on the walking stick 4.

The handle 42 is fixedly arranged on a side surface of the support rod 41. The handle 42 has a rod-shaped overall structure, and the handle 42 extends to the outside of the support rod 41.

An arc-shaped surface 421 is formed on the handle 42, and the arc-shaped surface 421 is configured to be adapted to a hand part between the thumb and index of the patient (a first web). In practical use, the patient can hold the handle 42 with a hand, and the arc-shaped surface 421 can be adapted to the hand part between the thumb and index of the patient, improving the gripping comfort and gripping strength of the hand on the handle 42.

The length of the support rod 41 is adjustable. The length of the support rod 41 can be adjusted according to the patient's physique, so that patients with different heights can comfortably use the walking stick 4.

The support rod 41 includes a first rod section 411 and a second rod section 412. The first rod section 411 is slidably arranged in the second rod section 412, and when the first rod section 411 slides on the second rod section 412, the first rod section 411 can extend out of the second rod section 412 or retract into the second rod section 412, thus realizing the adjustment of the length of the support rod 41.

Figure 7:
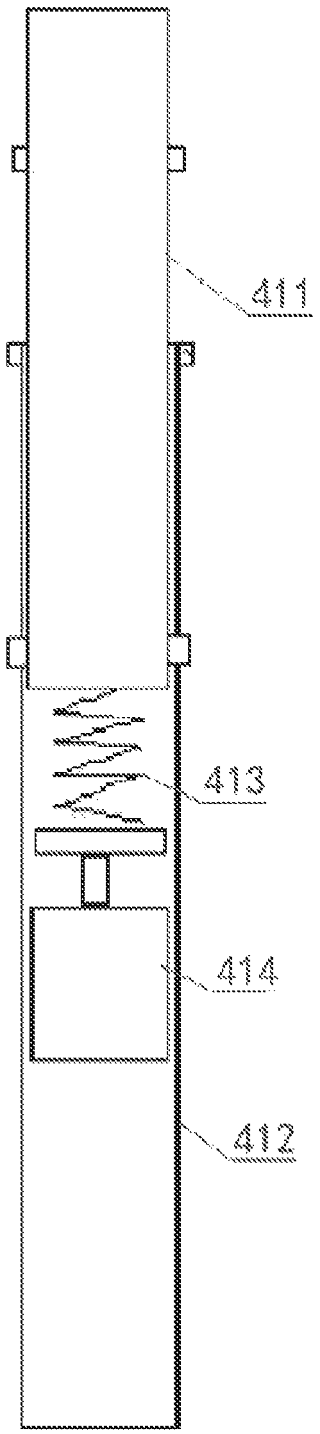
FIG. 7 is an internal structural schematic diagram of a support rod of the present disclosure.
Figure 8:
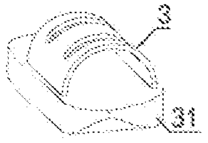
FIG. 8 is a structural schematic diagram of a shoe of the present disclosure.

As shown in FIG. 7, in some embodiments, a spring 413 is provided between the first rod section 411 and the second rod section 412, and when the first rod section 411 slides on the second rod section 412, the spring 413 may be compressed or released. A motor 414 is provided on the spring 413, and the motor 414 is configured to adjust tightness of the spring 413 according to a second control signal.

Specifically, one end of the spring 413 is arranged on the first rod section 411, the other end of the spring 413 is arranged on a push rod of the motor 414, and the motor 414 is fixedly arranged on the second rod section 412. When the motor 414 is operating, the push rod may be close to or away from the spring 413.

In practical use, when the motor 414 is operating, the push rod may be close to or away from the spring. When the motor 414 is close to the spring 413, the spring 413 is compressed, improving an elastic force of the spring 413. When the motor 414 is away from the spring 413, the spring 413 is released, decreasing the elastic force of the spring 413. In practical use, when the elastic force of the spring 413 is increased, the rigidity of the walking stick is enhanced, the supporting force of the walking stick to the patient is increased, making the healthy side of the patient share a smaller weight in the walking process, so as to improve the degree of dependency of the patient on the walking stick, and avoid the problem of exacerbation of the disease caused by excessive load on the affected side. When the elastic force of the spring 413 is decreased, the rigidity of the walking stick 4 is weakened, and the supporting force of the walking stick 4 to the patient is reduced, making the healthy side of the patient share a larger weight in the walking process, so as to reduce the degree of dependency of the patient on the walking stick 4, improve the exercise intensity of the affected side, and facilitate the healthy side to obtain more exercises.

The walking stick 4 further includes an arm bracket 43, and the arm bracket 43 is configured to be borne on an arm of the patient.

In practical use, the patient grips the handle 42 with a hand, and the arm bracket 43 can be borne below the patient's arm, improving the supporting effect of the walking stick 4 on the patient.

An overall structure of the arm bracket 43 is in a plate shape. The arm bracket 43 is fixedly provided at an upper end of the support rod 41, and an included angle between a length direction of the arm bracket 43 and a length direction of the support rod 41 is an acute angle. This acute angle is 30-45° C.

The walking stick 4 further includes a fitting member 44, and the fitting member 44 is configured to be fitted on the patient's arm. An overall structure of the fitting member 44 is in a "U" shape. The fitting member 44 is fixedly provided at an upper end of the arm bracket 43.

In practical use, the arm bracket 43 is borne on the patient's arm, and the fitting member 44 is fitted on the patient's arm, preventing the patient's arm from shaking on the arm bracket 43, and the fitting member 44 functions to position the patient's arm on the arm bracket 43.

The shoe 3 is configured to be worn on the foot of the healthy side of the patient.

The shoe 3 is shaped like a slipper, and it includes a shoe sole 31. In practical use, the foot of the healthy side of the patient steps on the shoe sole 31.

The shoe sole 31 is made of a soft material, improving the comfort of wearing. The soft material may be made of a plastic, a foam material or the like.

The first sensor 71 is configured to detect a pressure received by the shoe sole 31 and generate a first electrical signal.

In the above, the first sensor 71 may be a force-sensitive sensor. When the first sensor 71 detects the pressure received by the shoe sole 31, the pressure is converted into a second signal used to represent the above pressure according to a certain rule, and the second signal is sent to the control unit 6.

Figure 9:
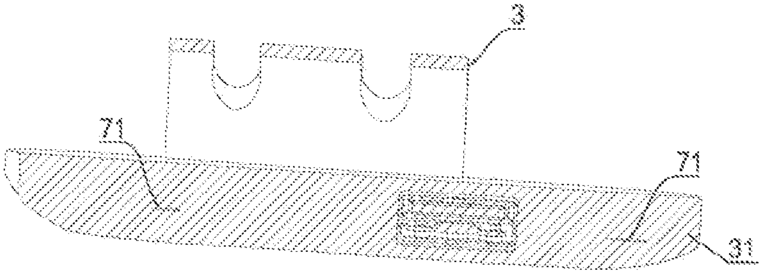
FIG. 9 is a sectional structural schematic diagram of the shoe of the present disclosure.
Figure 10:
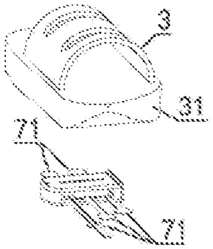
FIG. 10 is an exploded structural schematic diagram of the shoe of the present disclosure.

As shown in FIG. 9 and FIG. 10, specifically, the first sensor 71 is provided on the shoe sole 31. In practical use, when the patient wears the shoe 3 on the foot of the healthy side and walks, the first sensor 71 detects the pressure received by the shoe sole 31, i.e., the pressure applied by the foot to the shoe sole 31.

The first sensor 71 is configured to detect a pressure received by a front part of the shoe sole 31 of the shoe 3 or/and a rear part of the shoe sole 31 of the shoe 3 and generate the first electrical signal.

Specifically, the first sensor 71 is configured to only detect the pressure received by the front part of the shoe sole 31 of the shoe 3 and generate the first electrical signal. Alternatively, the first sensor 71 is configured to only detect the pressure received by the rear part of the shoe sole 31 of the shoe 3 and generate the first electrical signal. Alternatively, the first sensor 71 is configured to detect the pressure received by the front part of the shoe sole 31 of the shoe 3 and the rear part of the shoe sole 31 of the shoe 3 and generate the first electrical signal. In the present embodiment, the first sensor 71 is configured to detect the pressure received by the front part of the shoe sole 31 of the shoe 3 and the rear part of the shoe sole 31 of the shoe 3 and generate the first electrical signal.

In practical use, the first sensor 71 can detect the pressure on the front part of the shoe sole 31 of the shoe 3 and the pressure on the rear part of the shoe sole 31 of the shoe 3 respectively and generate the second signal to be sent to the control unit 6, and send a first electrical signal to the control unit 6.

The front part of the shoe sole 31 is provided with the first sensor 71, and the rear part of the shoe sole 31 is provided with the first sensor 71. The first sensor 71 in the front part of the shoe sole 31 is configured to detect the pressure on the front part of the shoe sole 31. The first sensor 71 in the rear part of the shoe sole 31 is configured to detect the pressure received by the rear part of the shoe sole 31.

In some other embodiments, at least two first sensors 71 are provided. The front part of the shoe sole 31 is provided with at least one first sensor 71. The rear part of the shoe sole 31 is also provided with at least one first sensor 71.

The second sensor 72 is configured to detect whether the walking stick 4 touches the ground, and will not generate a second electrical signal when detecting that the walking stick does not touch the ground.

In some embodiments, the second sensor 72, when detecting that the walking stick 4 touches the ground, generates the second electrical signal and sends the same to the control unit 6.

In practical use, when the walking stick 4 does not touch the ground, the walking stick does not have a supporting effect on the patient. When the walking stick 4 touches the ground, the walking stick 4 is supported on the ground, thus functioning to support the patient.

The second sensor 72 is any one of a pressure sensor, a contact switch, a proximity switch, and a micro-switch.

For example, the second sensor 72 is a pressure sensor. When the walking stick touches the ground, the walking stick has the supporting function on the patient, and the walking stick can receive the pressure. The second sensor 72 can detect the pressure received by the walking stick 4, the pressure is converted into the second electrical signal used to represent the above pressure according to a certain rule, and the second electrical signal is sent to the control unit 6. A value of the second electrical signal becomes larger as the pressure received by the walking stick 4 becomes larger.

For another example, the second sensor 72 is a contact switch. When the walking stick touches the ground, the ground may touch the second sensor 72, so that the second sensor 72 generates the second electrical signal and the second electrical signal is sent to the control unit 6.

For another example, the second sensor 72 is a proximity switch. The ground is a detected object of the second sensor 72. When the walking stick touches the ground, the ground is located within a detection range of the second sensor 72, so that the second sensor 72 generates the second electrical signal and the second electrical signal is sent to the control unit 6.

For another example, the second sensor 72 is a micro-switch. When the walking stick touches the ground, the ground applies a pressure to the second sensor 72, and a movable contact point and a stationary contact point of the second sensor 72 are in contact, so that the second sensor 72 generates the second electrical signal and the second electrical signal is sent to the control unit 6.

In some embodiments, the second sensor 72 is provided in a bottom portion of the support rod 41. In practical use, when the walking stick 4 stands on the ground, the second sensor 72 is located between the walking stick 4 and the ground, and the second sensor 72 touches the ground. The second sensor 72 is preferably a pressure sensor.

The third sensor 73 is configured to detect whether the third sensor itself is triggered. When the third sensor 73 is triggered, a third electrical signal is generated and sent to the control unit 6.

When the third sensor 73 is not triggered, the third electrical signal is not generated.

In practical use, the patient can hold the walking sticking 4 with a hand close to the healthy side. When the patient does not hold the walking sticking with a hand, the third sensor 73 does not generate the third electrical signal. When the patient holds the walking sticking 4 with a hand, the third sensor 73 can generate the third electrical signal.

The third sensor 73 is any one of a pressure sensor, a contact switch, a proximity switch, and a micro-switch.

In some embodiments, the third sensor 73 is a contact switch. When the patient neither holds the walking sticking with a hand, nor touches the third sensor 73, the third electrical signal is not generated. When the patient holds the walking sticking with a hand, he/she can meanwhile touch the third sensor 73, so that the third electrical signal is generated and sent to the control unit 6.

In some embodiments, the third sensor 73 is provided on the handle 42. In practical use, the hand gripping the handle 42 may simultaneously touch the third sensor 73.

A fourth sensor 74 is configured to detect a movement of the healthy-side exoskeleton and generate a fourth electrical signal, wherein the fourth electrical signal represents a movement parameter of the healthy side.

In the above, when the fourth sensor 74 detects the movement of the healthy-side exoskeleton 1, the movement is converted into the fourth electrical signal according to a certain rule and the fourth electrical signal is sent to the control unit 6.

The fourth sensor 74 is provided on at least one position of the healthy-side hip mechanical joint, the healthy-side knee mechanical joint, and the healthy-side ankle mechanical joint. The fourth sensor 74 is configured to detect movement of at least one of the healthy-side hip mechanical joint, the healthy-side knee mechanical joint, and the healthy-side ankle mechanical joint and generate the fourth electrical signal.

In the present embodiment, there are two fourth sensors 74. One fourth sensor 74 is provided on the healthy-side hip mechanical joint, and this fourth sensor 74 is configured to detect a movement of the healthy-side hip mechanical joint. The movement of the healthy-side hip mechanical joint refers to back and forth rotation of the thigh bracket 13 relative to the hip bracket 11. The other fourth sensor 74 is provided on the healthy-side knee mechanical joint. This fourth sensor 74 is configured to detect a movement of the knee mechanical joint. The movement of the healthy-side knee mechanical joint refers to rotation of the shank bracket 14 relative to the thigh bracket 13.

Specifically, the fourth sensor 74 is an angle sensor, and the fourth sensor 74 is configured to detect an angle of the thigh bracket 13 relative to the hip bracket 11 and an angle of the shank bracket 14 relative to the thigh bracket 13 in real time, and convert the angles into the fourth electrical signals used to represent the above angles.

The driving device 5 is configured to drive the affected-side exoskeleton 2.

In the above, the driving device 5 refers to a mechanical device configured to convert other energies into mechanical energy of the affected-side exoskeleton 2. Other energies may be electrical energy, and the driving device 5 may be an electric motor. In practical use, the driving device 5 may drive the affected-side exoskeleton 2 according to a first control signal generated by the control unit 6.

The driving device 5 is provided on at least one position of the affected-side hip mechanical joint, the affected-side knee mechanical joint, and the affected-side ankle mechanical joint. The driving device 5 is configured to drive at least one of the affected-side hip mechanical joint, the affected-side knee mechanical joint, and the affected-side ankle mechanical joint.

In the present embodiment, there are two driving devices 5. One driving device 5 is provided on the affected-side hip mechanical joint, and this driving device 5 is configured to drive the affected-side hip mechanical joint. Driving the affected-side hip mechanical joint refers to driving the thigh support 23 to rotate back and forth relative to the hip support 21. The other driving device 5 is provided on the affected-side knee mechanical joint. This driving device 5 is configured to drive the movement of the affected-side knee mechanical joint. Driving the affected-side knee mechanical joint refers to driving rotation of the shank support 24 relative to the thigh.

The control unit 6 is configured to judge, according to the first electrical signal, whether to generate the first control signal.

In the above, the control unit 6 may be a single-chip microcomputer. An overall structure of the control unit 6 is in a backpack shape. The control unit 6 is provided between the hip bracket 11 and the hip support 21.

In some embodiments, when the control unit 6 is configured to judge whether to generate the first control signal according to the first electrical signal: the control unit is configured to not generate the first control signal when the first electrical signal received is less than a first safety value.

In the above, the first electrical signal is configured to represent a pressure currently received by the shoe sole 31. The first safety value is configured to represent a minimum safety pressure received by the shoe sole 31. In practical use, when the pressure currently received by the shoe 3 is less than the minimum safety pressure and the patient steps out on the affected side, the healthy side cannot stably support the patient, and the patient is very likely to have a problem of body shaking or even fall-down. Therefore, when the first electrical signal is less than the first safety value, the first control signal is not generated, thus avoiding the driving device 5 from driving the affected side to step out, and further causing the risk of sideway shaking of the patient's body and even fall-down.

In some embodiments, the control unit 6 is configured to generate the first control signal and send the same to the driving device 5 when the first electrical signal received is not less than the first safety value.

In the above, when the pressure currently received by the shoe 3 is not less than the minimum safety pressure and the patient steps out on the affected side, the healthy side can steadily support the patient, avoiding the problem of body shaking and fall-down of the patient. When the first electrical signal is not less than the first safety value, the first control signal is generated, ensuring that the patient steps out on the affected side in a situation of standing firm on the healthy side. This control manner is applicable to situations where the patient's healthy side can support the patient's entire body.

The first safety value can be preset in the control unit 6 in a programming manner. In some embodiments, the first safety value is 30-100 N. The first safety value is preferably 50 N.

In some embodiments, the first electrical signal includes the first electrical signal from the front part of the shoe sole 31 and the first electrical signal from the rear part of the shoe sole 31. The control unit 6 generates the first control signal and sends the same to the driving device 5 when the first electrical signal received is not less than the first safety value.

In the above, the first electrical signal received being not less than a first safety value means that the first electrical signal from the front part of the shoe sole 31 is not less than the first safety value and that the first electrical signal from the rear part of the shoe sole 31 is not less than the first safety value.

In some embodiments, the front part of the shoe sole 31 is provided with three first sensors, and the rear part of the shoe sole 31 is provided with three first sensors. When the first electrical signal detected by at least one of the three first sensors in the front part of the shoe sole 31 is not less than the first safety value and the first electrical signal detected by at least one of the three first sensors in the rear part of the shoe sole 31 is not less than the first safety value, the first control signal is generated and sent to the driving device 5.

In some embodiments, the driving device 5 is further configured to generate a gait cycle according to the first electrical signal, and to judge whether to generate the first control signal according to the first electrical signal and the gait cycle.

In the above, the gait cycle is used to represent time taken by the foot of the healthy side to be lifted from the ground and stride out and land on the ground again.

In some embodiments, the control unit 6 is configured to judge whether to generate the first control signal according to the first electrical signal and the gait cycle: to not generate the first control signal when the gait cycle generated is less than the safety time.

In the above, the safety time is configured to represent minimum time taken by the foot of the healthy side to normally take a step. In practical use, when the gait cycle is less than the safety time and the patient steps out on the affected side, the patient's healthy side does not normally take a step, the patient's affected side normally takes a step, there is a problem of incoordination between gaits of the healthy side and the affected side of the patient, easily causing the problem of unbalanced center of gravity and even fall-down of the patient. However, when the gait cycle is not less than the safety time and the patient steps out on the affected side, the healthy side and the affected side of the patient normally step alternately, ensuring the gait coordination of the patient.

In some embodiments, when the first electrical signal received by the control unit 6 is not less than the first safety value and the gait cycle is not less than the safety time, the first control signal is generated and sent to the driving device 5.

In the above, the first electrical signal received by the control unit 6 being not less than the first safety value and the gait cycle being not less than the safety time mean that the control unit 6 not only ensures that the affected side is stepped out when the healthy side stands firm, but also ensures the gait coordination between the affected side and the healthy side. This control manner is suitable for performing coordination training on the affected side and the healthy side in cases where the healthy side of the patient is substantially recovered.

The safety time can be preset in the control unit 6 in a programming manner. In some embodiments, the safety time is 0.5-1.45 seconds. In the present embodiment, the safety time is preferably 1 second.

In some embodiments, the control unit 6 is further configured to judge whether to generate the first control signal according to the first electrical signal and the second electrical signal.

In some embodiments, when the control unit 6 is configured to judge whether to generate the first control signal according to the first electrical signal and the second electrical signal: the control unit 6 is configured to not generate the first control signal when the second electrical signal is not received.

In the above, the control unit 6 receiving the second electrical signal refers to that the walking stick touches the ground, and the second sensor generates the second electrical signal and sends the same to the control unit 6. The control unit 6 not receiving the second electrical signal refers to that the walking stick does not touch the ground, and the second sensor is not triggered. In practical use, when the walking stick does not touch the ground and the patient steps out on the affected side, the walking stick does not have a supporting effect on the patient, in this case the healthy side supports the patient's body alone, which is very likely to cause the problems that the healthy side suffers from muscular damage and even the patient falls down. When the walking stick touches the ground and the patient steps out on the affected side, the walking stick has a supporting effect on the patient, in this case the healthy side and the walking stick together have a supporting effect on the patient's body, thereby ensuring physical safety of the patient to a certain extent when performing rehabilitation movements.

In some embodiments, the control unit 6 generates the first control signal and sends the same to the driving device 5 when the first electrical signal received is not less than the first safety value and the second electrical signal is received.

In some embodiments, the second sensor 72 is a pressure sensor. The control unit 6 is further configured to not generate the first control signal when the second electrical signal received is less than the second safety value.

In the above, the second electrical signal refers to a current pressure received by the walking stick, and the second safety value refers to a minimum safety pressure received by the walking stick when the walking stick and the healthy side support the patient's body together. In practical use, when the current pressure received by the walking stick is less than the minimum safety pressure and the patient steps out on the affected side, in this case the supporting effect of the walking stick to the patient is not ideal enough, and the healthy side may support the patient's body alone, which may cause the problem of muscular damage of the healthy side. When the current pressure received by the walking stick is not less than the minimum safety pressure and the patient steps out on the affected side, in this case, the supporting effect of the walking stick to the patient is ideal enough, further ensuring the physical safety when the patient performs the rehabilitation movements.

The second safety value may be preset in the control unit 6 in a programming manner. In some embodiments, the second safety value may be 50-200 N. In the present embodiment, the second safety value is preferably 100 N.

In some embodiments, the control unit 6 is further configured to generate the first control signal and send the same to the driving device 5 when the first electrical signal received is not less than the first safety value and the second electrical signal received is not less than the second safety value.

In the above, the first electrical signal received by the control unit 6 being not less than the first safety value and the second electrical signal received by the control unit 6 being not less than the second safety value mean not only ensuring that the affected side is stepped out when the healthy side stands firm, but also ensuring that the walking stick and the healthy side work together on the patient's body when stepping out on the affected side. This control manner is suitable to cases where the healthy side of the patient is not completely recovered and the walking stick is needed for assistance.

In some embodiments, the control unit 6 is further configured to generate the first control signal and send the same to the driving device 5 when the first electrical signal received is not less than the first safety value, the gait cycle is not less than the safety time, and the second electrical signal received is not less than the second safety value.

In the above, the first electrical signal received by the control unit 6 being not less than the first safety value, the gait cycle being not less than the safety time, and the second electrical signal received being not less than the second safety value mean that the control unit 6 ensures that the affected side is stepped out when the healthy side stands firm, and also ensures the gait coordination between the affected side and the healthy side and combined action of the walking stick and the healthy side on the patient's body when stepping out on affected side.

In some embodiments, the control unit 6 can generate the second control signal according to the second electrical signal, and the motor 414 compresses or releases the spring 413 according to the second control signal.

In the above, the second control signal represents movement data including a movement speed, a movement angle, a direction, and the like of the motor 414. A current pressure received by the walking stick is positively correlated with a current amount of deformation of the spring, and when the current pressure received by the walking stick decreases gradually, the current amount of deformation of the spring also decreases gradually. The current amount of deformation of the spring decreasing gradually means that the motor 414 gradually releases the spring, and the spring extends in a direction of restoring an original length.

In practical use, with gradual rehabilitation of the patient, the strength of the lower limb of the healthy side of the patient also will be continuously recovered and enhanced, the pressure of the patient on the walking stick 4 is also gradually reduced, and the motor 414 can automatically release the spring 413, so that the patient gradually reduces the degree of dependency on the walking stick, thus achieving the effect that the motor 414 automatically adjusts the degree of dependency of the patient on the walking stick.

Specifically, the current pressure received by the walking stick and the amount of deformation of the spring can be converted according to the following formula: current amount of deformation of the spring=coefficient*initial amount of deformation of the spring*current pressure received by the walking stick/initial pressure received by the walking stick. The initial amount of deformation of the spring refers to an amount of deformation generated on the spring in an initial stage of the rehabilitation movement of the patient. The initial pressure received by the walking stick refers to the pressure received by the walking stick 4 in the initial stage of the rehabilitation movement. In order to reduce the error of the initial pressure received by the walking stick and detected by the second sensor 72, a direct averaging method numerical value is used to obtain an average value. For example, when the patient just uses the walking stick 4, the second electrical signal may be detected multiple times to obtain the pressure received by the walking stick, and an average value of the multiple pressures is taken as an initial pressure received by the walking stick.

In some embodiments, when a ratio of the current pressure received by the walking stick to the initial pressure received by the walking stick is less than a walking-stick-removal coefficient, the control unit 6 generates an alarm signal, and the alarm signal is configured to remind the patient to remove the walking stick 4.

In the above, when the ratio of the current pressure received by the walking stick to the initial pressure received by the walking stick is less than the walking-stick-removal coefficient, the patient's healthy side has recovered to be capable of supporting his/her entire body alone. When the ratio of the current pressure received by the walking stick to the initial pressure received by the walking stick is not less than the walking-stick-removal coefficient, the patient's healthy side has not recovered to be capable of supporting his/her entire body alone, and the patient still needs to walk with the assistance of the walking stick 4. The alarm signal can be converted into an acoustic signal, an optical signal, a vibration signal, etc. through an output device (not shown in the drawings), and the patient can judge, according to the above signals, whether to remove the walking stick 4. The control unit 6 determines whether to remove the walking stick by comparing the current pressure received by the walking stick with the initial pressure received by the walking stick, achieving the effect of monitoring the recovery state of the patient, and facilitating the patient to switch the control manner to a mode suitable for the current physical state. In the present embodiment, the walking-stick-removal coefficient is preferably ⅓.

In some embodiments, the control unit 6 is further configured to judge whether to generate the first control signal according to the first electrical signal and the third electrical signal.

In some embodiments, the control unit 6 is configured to judge whether to generate the first control signal according to the first electrical signal and the third electrical signal: the control unit 6 is configured to not generate the first control signal when the third electrical signal is not received.

In the above, the control unit 6 not receiving the third electrical signal refers to that the patient does not hold the handle with a hand. In practical use, when the patient does not hold the handle with a hand and steps out on the affected side, the walking stick does not have a supporting effect on the patient, and the healthy side may function to support the patient's body alone, which may cause the problem that the support strength of the healthy side is not enough. When the patient holds the handle with a hand and steps out on the affected side, the walking stick and the healthy side may have a supporting effect on the patient together, thus ensuring personal safety when the patient performs rehabilitation movements.

In some embodiments, the control unit 6 generates the first control signal and sends the same to the driving device 5 when the first electrical signal received is not less than the first safety value and the third electrical signal is received. It is ensured that the affected side is stepped out when the healthy side stands firm on the ground and the patient holds the handle with a hand.

In some embodiments, the control unit 6 generates the first control signal and sends the same to the driving device 5 when the first electrical signal received is not less than the first safety value and the second electrical signal and the third electrical signal are received.

In some embodiments, the control unit 6 generates the first control signal and sends the same to the driving device 5 when the first electrical signal received is not less than the first safety value, the second electrical signal received is not less than the second safety value, and the third electrical signal is received. It is ensured that the affected side is stepped out when the healthy side stands firm on the ground, the patient holds the handle with a hand, and the walking stick stably touches the ground.

In some embodiments, the control unit 6 generates the first control signal and sends the same to the driving device 5 when the first electrical signal received is not less than the first safety value, the gait cycle is not less than the safety time, the second electrical signal received is not less than the second safety value, and the third electrical signal is received. It is ensured that the driving device drives the affected side to be stepped out in cases where the healthy side stands firm on the ground, the patient holds the handle with a hand, the walking stick stably touches the ground, and the healthy side normally takes a step.

In some embodiments, the first control signal includes preset affected-side movement parameters.

In the above, the preset affected-side movement parameters are preset in the control unit 6 by a program, and the control unit 6 generates the first control signal according to a preset program. The preset affected-side movement parameters include movement data such as stride, gait cycle, and time of driving the affected side to be stepped out by the driving device, and the driving device drives the affected-side exoskeleton according to the first control signal generated according to the preset affected-side movement parameters.

In some embodiments, the first control signal includes healthy-side movement parameters represented by the fourth electrical signal.

In the above, the healthy-side movement parameters refer to movement data such as gait cycle, stride, and time of the healthy side. The fourth electrical signal generates the first control signal through calculation of the control unit 6. The first control signal contains the healthy-side movement parameters represented by the fourth electrical signal. The fourth healthy-side movement parameters refer to movement data such as movement speed and movement amplitude generated by the healthy-side exoskeleton. The fourth electrical signal is converted into the first control signal by a program, and the driving device drives the affected-side exoskeleton 2, according to the first control signal, to simulate movements of the healthy-side exoskeleton 1, thus achieving the effect that the affected side simulates the movements of the healthy side.

Specifically, the control unit 6 is configured to control, according to an angle of the healthy-side hip mechanical joint detected by the fourth sensor 74, the driving device 5 to drive the affected-side hip mechanical joint to simulate movements of the healthy-side hip mechanical joint. The control unit 6 is further configured to, according to an angle of the healthy-side knee mechanical joint detected by the fourth sensor 74, control the driving device 5 to drive the affected-side knee mechanical joint to simulate movements of the healthy-side knee mechanical joint.

Correspondingly, an embodiment of the present disclosure further provides a control method of an exoskeleton for rehabilitation, implemented by the exoskeleton for rehabilitation provided in the embodiments of the present disclosure, and this method is configured for rehabilitation training of the affected side. The control method includes:

- detecting a pressure received by a shoe sole 31 and generating a first electrical signal; and
- judging whether to generate a first control signal according to the first electrical signal.

In some embodiments, the step of judging whether to generate a first control signal according to the first electrical signal includes: not generating the first control signal for driving an affected-side exoskeleton when the first electrical signal received is less than a first safety value.

In some embodiments, following steps are further included:

- generating a gait cycle according to the first electrical signal, and judging whether to generate the first control signal according to the first electrical signal and the gait cycle.

In some embodiments, the step of judging whether to generate the first control signal according to the first electrical signal and the gait cycle includes: not generating the first control signal when the gait cycle generated is less than the safety time.

In some embodiments, following steps are further included:

- generating a second electrical signal when detecting that the walking stick touches ground; and
- judging whether to generate the first control signal according to the first electrical signal and the second electrical signal.

In some embodiments, the above step of judging whether to generate the first control signal according to the first electrical signal and the second electrical signal includes: not generating the first control signal when not receiving the second electrical signal.

In some embodiments, following steps are further included:

- generating a second control signal according to the second electrical signal; and
- compressing or releasing the spring according to the second control signal.

In some embodiments, following steps are further included:

- generating a third electrical signal when detecting that a third sensor is triggered; and
- judging whether to generate the first control signal according to the first electrical signal and the third electrical signal.

In some embodiments, the step of judging whether to generate the first control signal according to the first electrical signal and the third electrical signal: not generating the first control signal when not receiving the third electrical signal.

In some embodiments, a following step is further included:

- the first control signal including preset affected-side movement parameters.

In some embodiments, following steps are further included:

- detecting a movement of a healthy-side exoskeleton and generating a fourth electrical signal, wherein the fourth electrical signal represents a movement parameter of the healthy side, wherein
- the first control signal contains the movement parameter of the healthy side represented by the fourth electrical signal.

Figure 11:
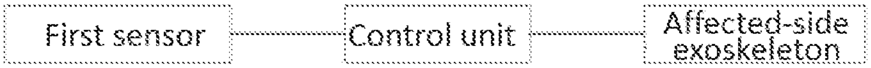
FIG. 11 is a structural schematic diagram of a control system of some embodiments of the present disclosure.

As shown in FIG. 11, in some embodiments, a following step is further included:

- generating the first control signal and sending the same to the driving device 5 when the first electrical signal received is not less than the first safety value.

In the above, in this control manner, when the shoe 3 lands steadily on the ground, the driving device 5 drives the affected side to move.

As shown in FIG. 11, in some embodiments, a following step is further included:

the control unit 6 generating the first control signal and sending the same to the driving device 5 when the first electrical signal received is not less than the first safety value and the gait cycle is not less than the safety time.

In the above, in this control manner, when the shoe 3 completes stepping actions of landing-lifting-landing and lands steadily on the ground, the driving device 5 drives the affected side to move. A gait cycle signal generated in the above process of landing-lifting-landing of the shoe 3 is regular, which is used by the control unit to judge whether the exoskeleton for rehabilitation is in a normal walking state. In order to exclude false triggering of the affected-side exoskeleton caused by a random action of the patient, a generation order of signals of various sensors received by the control unit should follow a particular mode, for example, in one walking process of the patient, a generation order of signals received by the control unit is as follows: the shoe 3 takes a step forward, when the first sensor 71 of the shoe sole 31 is triggered to generate the first electrical signal that is not less than the first safety value and the time taken by the shoe 3 to take a step is not less than the safety time, it indicates that the lower limb of the healthy side is completely stable and takes a step normally, then the control unit 6 sends the first control signal to drive the affected-side exoskeleton to perform an action of walking forward. After the affected-side exoskeleton completes the first time of stepping, the exoskeleton for rehabilitation enters a normal action mode of stepping alternately on the healthy side and the affected side. After that, the healthy side walks forward again, and the affected side also walks forward again, so repeatedly.

Figure 12:
FIG. 12 is a structural schematic diagram of the control system of some other embodiments of the present disclosure.

As shown in FIG. 12, in some embodiments, the second sensor 72 is a micro-switch or a light touch switch, and the control unit 6 generates the first control signal and sends the same to the driving device 5 when the first electrical signal received is not less than the first safety value and the second electrical signal is received.

As shown in FIG. 12, in some embodiments, a following step is further included:

the control unit 6 generating the first control signal and sending the same to the driving device 5 when the first electrical signal received is not less than the first safety value and the second electrical signal received is not less than the second safety value.

In the above, in this control manner, when the shoe 3 lands steadily on the ground and the walking stick 4 also lands steadily on the ground, the driving device 5 drives the affected side to move.

As shown in FIG. 12, in some embodiments, a following step is further included:

the control unit 6 generating the first control signal and sending the same to the driving device 5 when the first electrical signal received is not less than the first safety value, the gait cycle is not less than the safety time, and the second electrical signal received is not less than the second safety value.

In the above, in this control manner, when the shoe 3 completes stepping actions of landing-lifting-landing, the shoe 3 lands steadily on the ground, and the walking stick 4 also lands steadily on the ground, the driving device 5 drives the affected side to move. A gait cycle signal generated in the above process of landing-lifting-landing of the shoe 3 is regular, and the control unit 6 is configured to judge whether the exoskeleton for rehabilitation is in a normal walking state. In order to exclude false triggering of the affected-side exoskeleton caused by a random action of the patient, a generation order of signals of various sensors received by the control unit 6 should follow a particular mode, for example, in one walking process of the patient, a generation order of signals received by the control unit is as follows: the bottom of the walking stick 4 is moved forward and lands, the second sensor 72 in the bottom portion of the walking stick 4 is triggered to send the second electrical signal that is not less than the second safety value; the shoe 3 takes a step forward to trigger the first sensor 71 of the shoe sole 31 to generate the first electrical signal, and the control unit 6 sends the first control signal to drive the affected-side exoskeleton to perform an action of walking forward only when the first electrical signal is not less than the first safety value and the time taken by the shoe 3 to take a step is not less than the safety time. After the affected-side exoskeleton completes the first time of stepping, the exoskeleton for rehabilitation enters a normal action mode of stepping alternately on the healthy side and the affected side. After that, the healthy side walks forward again, and the affected side also walks forward again, so repeatedly.

Figure 13:
FIG. 13 is a structural schematic diagram of the control system of some further embodiments of the present disclosure.

As shown in FIG. 13, in some embodiments, a following step is further included:

the control unit 6 generating the first control signal and sending the same to the driving device 5 when the first electrical signal received is not less than the first safety value and the third electrical signal is received.

In the above, in this control manner, when the shoe 3 lands steadily on the ground and the hand holding the walking stick 4 touches the third sensor 73, the driving device 5 drives the affected side to move.

Figure 14:
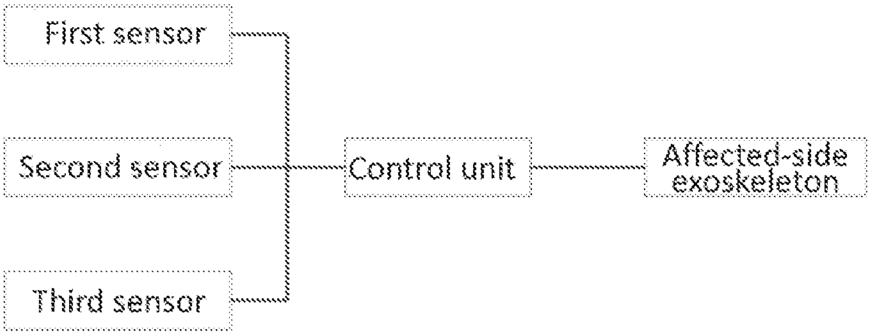
FIG. 14 is a structural schematic diagram of the control system of some further embodiments of the present disclosure.

As shown in FIG. 14, in some embodiments, the control unit 6 generates the first control signal and sends the same to the driving device 5, when the first electrical signal received by the control unit 6 is not less than the first safety value and the second electrical signal and the third electrical signal are received.

As shown in FIG. 14, in some embodiments, a following step is further included:

the control unit 6 generating the first control signal and sending the same to the driving device 5 when the first electrical signal received is not less than the first safety value, the second electrical signal received is not less than the second safety value, and the third electrical signal is received.

In the above, in this control manner, when the shoe 3 lands steadily on the ground, the walking stick 4 also lands steadily on the ground, and the hand holding the walking stick 4 touches the third sensor 73, the driving device 5 drives the affected side to move.

As shown in FIG. 14, in some embodiments, a following step is further included:

the control unit 6 generating the first control signal and sending the same to the driving device 5 when the first electrical signal received is not less than the first safety value, the gait cycle is not less than the safety time, the second electrical signal received is not less than the second safety value, and the third electrical signal is received.

In the above, in this control manner, when the shoe 3 completes stepping actions of landing-lifting-landing, the shoe 3 lands steadily on the ground, the walking stick 4 also lands steadily on the ground, and the hand holding the walking stick 4 touches the third sensor 73, the driving device 5 drives the affected side to move. A gait cycle signal generated in the above process of landing-lifting-landing of the shoe 3 is regular, and the control unit 6 is configured to judge whether the exoskeleton for rehabilitation is in a normal walking state. Optionally, in order to exclude false triggering of the affected-side exoskeleton caused by a random action of the patient, a generation order of signals of various sensors received by the control unit 6 should follow a particular mode, for example, in one walking process of the patient, a generation order of signals received by the control unit is as follows: the bottom of the walking stick 4 is moved forward and lands, the second sensor 72 in the bottom portion of the walking stick 4 is triggered to send the second electrical signal that is not less than the second safety value; the shoe 3 takes a step forward to trigger the first sensor 71 of the shoe sole 31 to generate the first electrical signal, wherein the first electrical signal is not less than the first safety value and the time taken by the shoe 3 to take a step is not less than the safety time, and then the third sensor 74 on the handle 42 of the walking stick 4 is pressed to generate the third electrical signal, such that the control unit 6 sends the first control signal to drive the affected-side exoskeleton to perform an action of walking forward. After the affected-side exoskeleton completes the first time of stepping, the exoskeleton for rehabilitation enters a normal action mode of stepping alternately on the healthy side and the affected side. After that, the healthy side walks forward again, and the affected side also walks forward again, so repeatedly.

The above embodiments are only preferred embodiments of the present disclosure, and the protection scope of the present disclosure is not limited thereby, so: all of equivalent variations made according to the structure, shape, and principle of the present disclosure should be covered within the scope of protection of the present disclosure.

INDUSTRIAL APPLICABILITY

In conclusion, the present disclosure provides an exoskeleton for rehabilitation. Such exoskeleton for rehabilitation can avoid the problem that the affected side takes a step when the healthy side does not stand firm, and can avoid the problem that the affected-side exoskeleton drives the affected side to move when the walking stick does not touch the ground or is not stable. Such exoskeleton for rehabilitation also coordinates the action of the affected side and the action of the walking stick, and has the advantages of good control for limb coordination, facilitating the completion of an uncoordinated gait movement, improving the autonomy of controlling the device by the patient, and having higher using safety, which facilitates better rehabilitation movement of the patient, and makes the device to be suitable for patients in different recovery stages.

Besides, it may be understood that the exoskeleton for rehabilitation in the present disclosure may be reproduced, and may be used in a variety of industrial applications. For example, the exoskeleton for rehabilitation of the present disclosure can be used in the technical field of medical devices.

What is claimed is:

1. An exoskeleton for rehabilitation, comprising:

a healthy-side exoskeleton, wherein the healthy-side exoskeleton is provided thereon with a first binding member, and the healthy-side exoskeleton is configured to be positioned on a healthy side of a patient through the first binding member;

an affected-side exoskeleton, wherein the affected-side exoskeleton is provided thereon with a second binding member, and the affected-side exoskeleton is configured to be positioned on an affected side of the patient through the second binding member;

a shoe, wherein the shoe is configured to be worn on a foot of the healthy side of the patient, and the shoe comprises a shoe sole for the foot of the healthy side of the patient to step on;

a first sensor, wherein the first sensor is provided on the shoe sole, and is configured to detect a pressure received by the shoe sole and generate a first electrical signal;

a control unit, wherein the control unit is connected to a support provided between the healthy-side exoskeleton and the affected-side exoskeleton, and the control unit is in communication connection with the first sensor, and is configured to judge, according to the first electrical signal, whether to generate the first control signal; and a driving device, wherein the driving device is provided on the affected-side exoskeleton, is configured to be in communication connection with the control unit, and drive the affected-side exoskeleton according to the first control signal, wherein the control unit being configured to judge, according to the first electrical signal, whether to generate the first control signal comprises: generating the first control signal and sending the first control signal to the driving device in cases where the first electrical signal is not less than a preset first safety value.

2. The exoskeleton for rehabilitation according to claim 1, wherein the healthy-side exoskeleton comprises at least one of a healthy-side hip mechanical joint, a healthy-side knee mechanical joint, and a healthy-side ankle mechanical joint, and degrees of freedom of the healthy-side hip mechanical joint, the healthy-side knee mechanical joint, and the healthy-side ankle mechanical joint are respectively configured to be consistent with degrees of freedom of a healthy-side hip joint, a healthy-side knee joint, and a healthy-side ankle joint of the patient.

3. The exoskeleton for rehabilitation according to claim 2, further comprising a second sensor, wherein the second sensor is provided on at least one position of the healthy-side hip mechanical joint, the healthy-side knee mechanical joint, and the healthy-side ankle mechanical joint, and is configured to detect a movement of the healthy-side exoskeleton and generate a second electrical signal representing healthy-side movement parameters; and the first control signal contains the healthy-side movement parameters represented by the second electrical signal.

4. The exoskeleton for rehabilitation according to claim 3, wherein the control unit is configured to: control the driving device to drive the affected-side hip mechanical joint to simulate movements of the healthy-side hip mechanical joint according to an angle of the healthy-side hip mechanical joint detected by the second sensor; control the driving device to drive the affected-side knee mechanical joint to simulate movements of the healthy-side knee mechanical joint according to an angle of the healthy-side knee mechanical joint detected by the second sensor; and/or control the driving device to drive the affected-side ankle mechanical joint to simulate movements of the healthy-side ankle mechanical joint according to an angle of the healthy-side ankle mechanical joint detected by the second sensor.

5. The exoskeleton for rehabilitation according to claim 1, wherein the affected-side exoskeleton comprises at least one of an affected-side hip mechanical joint, an affected-side knee mechanical joint, and an affected-side ankle mechanical joint, and degrees of freedom of the affected-side hip mechanical joint, the affected-side knee mechanical joint, and the affected-side ankle mechanical joint are respectively configured to be consistent with degrees of freedom of an affected-side hip joint, an affected-side knee joint, and an affected-side ankle joint of the patient.

6. The exoskeleton for rehabilitation according to claim 1, wherein the control unit is further configured to calculate a gait cycle according to the first electrical signal, and the control unit being configured to judge, according to the first electrical signal, whether to generate the first control signal comprises: generating the first control signal and sending the first control signal to the driving device in cases where the first electrical signal received is not less than the preset first safety value and the gait cycle is not less than preset safety time.

7. The exoskeleton for rehabilitation according to claim 1, wherein the exoskeleton for rehabilitation comprises a walking stick, and the walking stick is configured to be applied to the healthy side of the patient, and comprises a support rod having an adjustable length and a handle provided on a side surface of the support rod.

8. The exoskeleton for rehabilitation according to claim 7, wherein the exoskeleton for rehabilitation further comprises a second sensor, the second sensor is provided in a bottom portion of the support rod, and is configured to generate a second electrical signal when detecting that the walking stick touches a ground, and the control unit is configured to judge, according to the first electrical signal and the second electrical signal, whether to generate the first control signal and is configured to generate a second control signal according to the second electrical signal.

9. The exoskeleton for rehabilitation according to claim 8, wherein the control unit being configured to judge, according to the first electrical signal and the second electrical signal, whether to generate the first control signal comprises: not generating the first control signal in cases where the second electrical signal is not received.

10. The exoskeleton for rehabilitation according to claim 8, wherein the control unit being configured to judge, according to the first electrical signal and the second electrical signal, whether to generate the first control signal comprises: generating the first control signal and sending the first control signal to the driving device in cases where the first electrical signal received is not less than a preset first safety value and the second electrical signal received is not less than a preset second safety value.

11. The exoskeleton for rehabilitation according to claim 8, wherein the driving device is configured to generate a gait cycle according to the first electrical signal, and the control unit being configured to judge, according to the first electrical signal and the second electrical signal, whether to generate the first control signal comprises: generating the first control signal and sending the first control signal to the driving device in cases where the first electrical signal received is not less than a preset first safety value, the gait cycle is not less than a preset safety time, and the second electrical signal received is not less than a preset second safety value.

12. The exoskeleton for rehabilitation according to claim 8, wherein the second sensor is any one of a pressure sensor, a contact switch, a proximity switch, and a micro-switch.

13. The exoskeleton for rehabilitation according to claim 8, wherein the support rod comprises a first rod section and a second rod section, the first rod section is slidably arranged in the second rod section, a spring is provided between the first rod section and the second rod section, the second rod section is provided thereon with a motor, and the motor is configured to compress or release the spring according to the second control signal.

14. The exoskeleton for rehabilitation according to claim 8, further comprising a third sensor, wherein the third sensor is provided on the handle, and is configured to generate a third electrical signal when being detected to be triggered, and the control unit is configured to judge, according to the first electrical signal, the second electrical signal, and the third electrical signal, whether to generate the first control signal.

15. The exoskeleton for rehabilitation according to claim 1, wherein the control unit is provided therein with preset affected-side movement parameters, and the first control signal comprises the affected-side movement parameters.

* * * * *